US010122828B1

(12) United States Patent
Verma

(10) Patent No.: US 10,122,828 B1
(45) Date of Patent: Nov. 6, 2018

(54) GEOGRAPHIC-AWARE VIRTUAL DESKTOPS

(71) Applicant: Amazon Technologies, Inc., Seattle, WA (US)

(72) Inventor: Varun Verma, Newcastle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 482 days.

(21) Appl. No.: 14/547,821

(22) Filed: Nov. 19, 2014

(51) Int. Cl.
*G06F 15/16* (2006.01)
*H04L 29/06* (2006.01)
*H04L 29/12* (2006.01)

(52) U.S. Cl.
CPC .............. *H04L 67/42* (2013.01); *H04L 61/20* (2013.01)

(58) Field of Classification Search
CPC ............................... H04L 67/42; H04L 61/20
USPC ........................................................ 709/203
See application file for complete search history.

(56) References Cited

U.S. PATENT DOCUMENTS

2008/0201414 A1* 8/2008 Amir Husain .......... G06F 9/445
709/203
2013/0030916 A1* 1/2013 Skalet .................... G06Q 30/00
705/14.58
2013/0235874 A1* 9/2013 Ringdahl ............ H04L 12/4641
370/395.53

OTHER PUBLICATIONS

Vilches, Jose, How to Access Region-Locked Online Content From Anywhere, Techspot, Sep. 4, 2012.*
Anonymous web browsing—Wikipedia, the free encyclopedia.*
Muir, James A., "Internet Geolocation and Evasion," School of Computer Science, Carleton University, Ottawa Canada, pp. 1-22, Apr. 8, 2006.

* cited by examiner

*Primary Examiner* — Vivek Srivastava
*Assistant Examiner* — Karina J Garcia-Ching
(74) *Attorney, Agent, or Firm* — Klarquist Sparkman, LLP

(57) ABSTRACT

Systems and methods for geographic-aware virtual desktops are disclosed. In one example, a pool of network addresses can be maintained. Each network address can be associated with a respective geographical location. The pool of network addresses can include network addresses associated with different respective geographical locations. A geographical location associated with a client device accessing a virtual desktop can be determined. An external-facing network address can be selected from the pool of network addresses based on the geographical location associated with the client device. The external-facing network address can be assigned for network traffic associated with the virtual desktop.

19 Claims, 8 Drawing Sheets

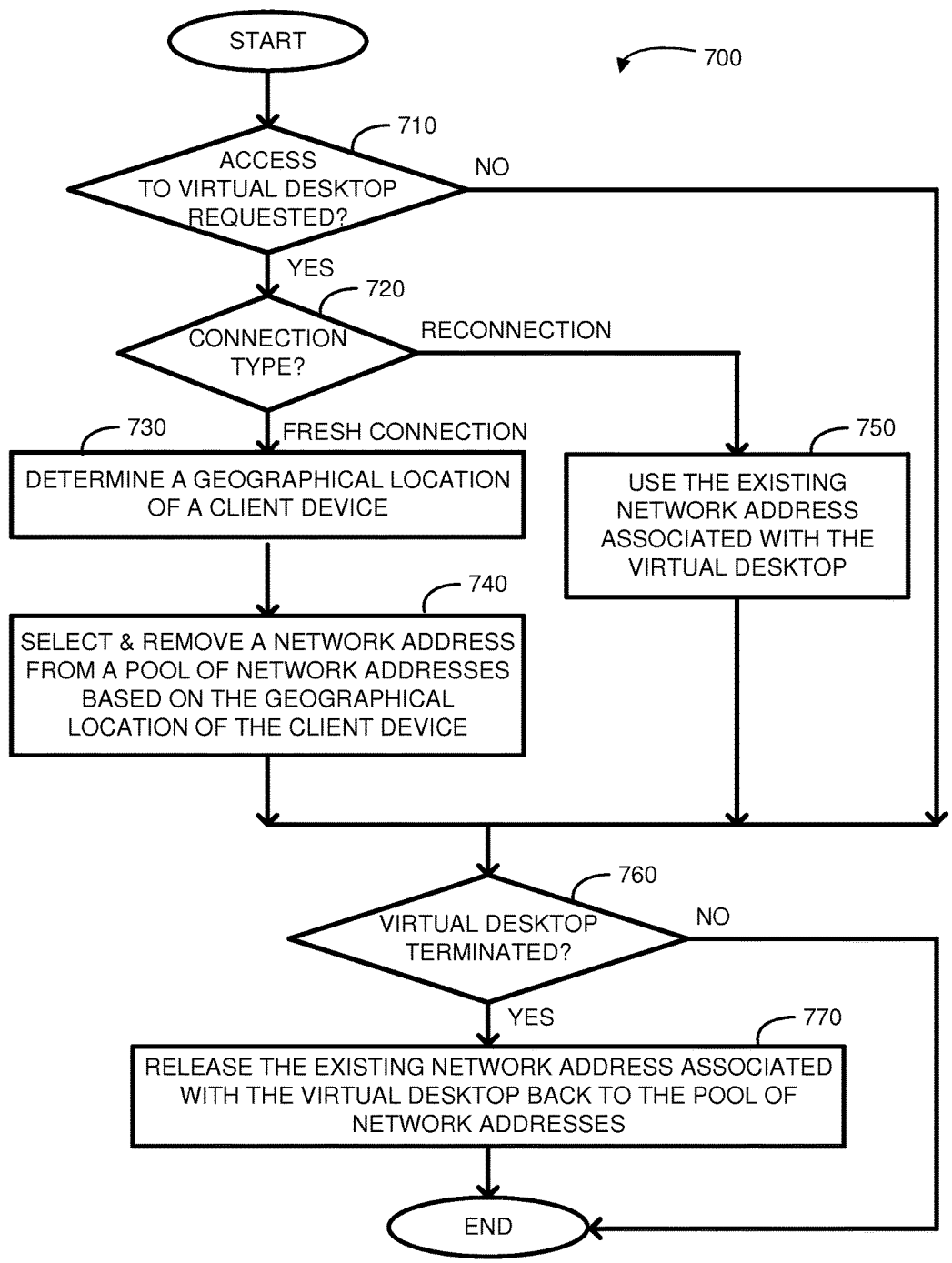

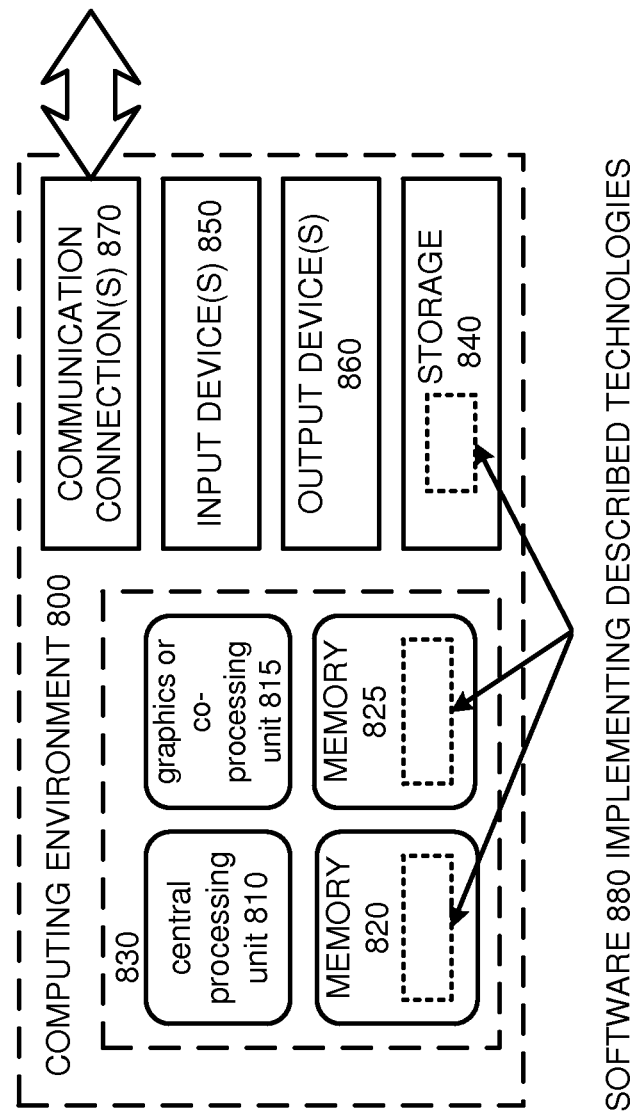

GEOGRAPHIC-AWARE VIRTUAL DESKTOPS

BACKGROUND

Cloud computing is the use of computing resources (hardware and software) which are available in a remote location and accessible over a network, such as the Internet. Users are able to buy these computing resources (including storage and computing power) as a utility on demand. Cloud computing entrusts remote services with a user's data, software and computation. Use of virtual computing resources can provide a number of advantages including cost advantages and/or ability to adapt rapidly to changing computing resource needs.

Cloud computing facilities can include services for providing a virtual desktop in the cloud. The virtual desktop service can provide an end-user with a desktop computing experience in the cloud where the end-user can access documents, applications, and resources with a client device. The cost of using a virtual desktop can be highly competitive with traditional desktops. The cloud service provider may desire to provide a high-quality experience for the end-user of the virtual desktop to encourage the end-user to continue using the virtual desktop.

BRIEF DESCRIPTION OF THE DRAWINGS

FIG. 7 is a flow diagram showing an example method for managing a pool of network addresses of a service provider.

FIG. 8 depicts a generalized example of a suitable computing environment in which the described innovations may be implemented.

DETAILED DESCRIPTION

Figure 1:
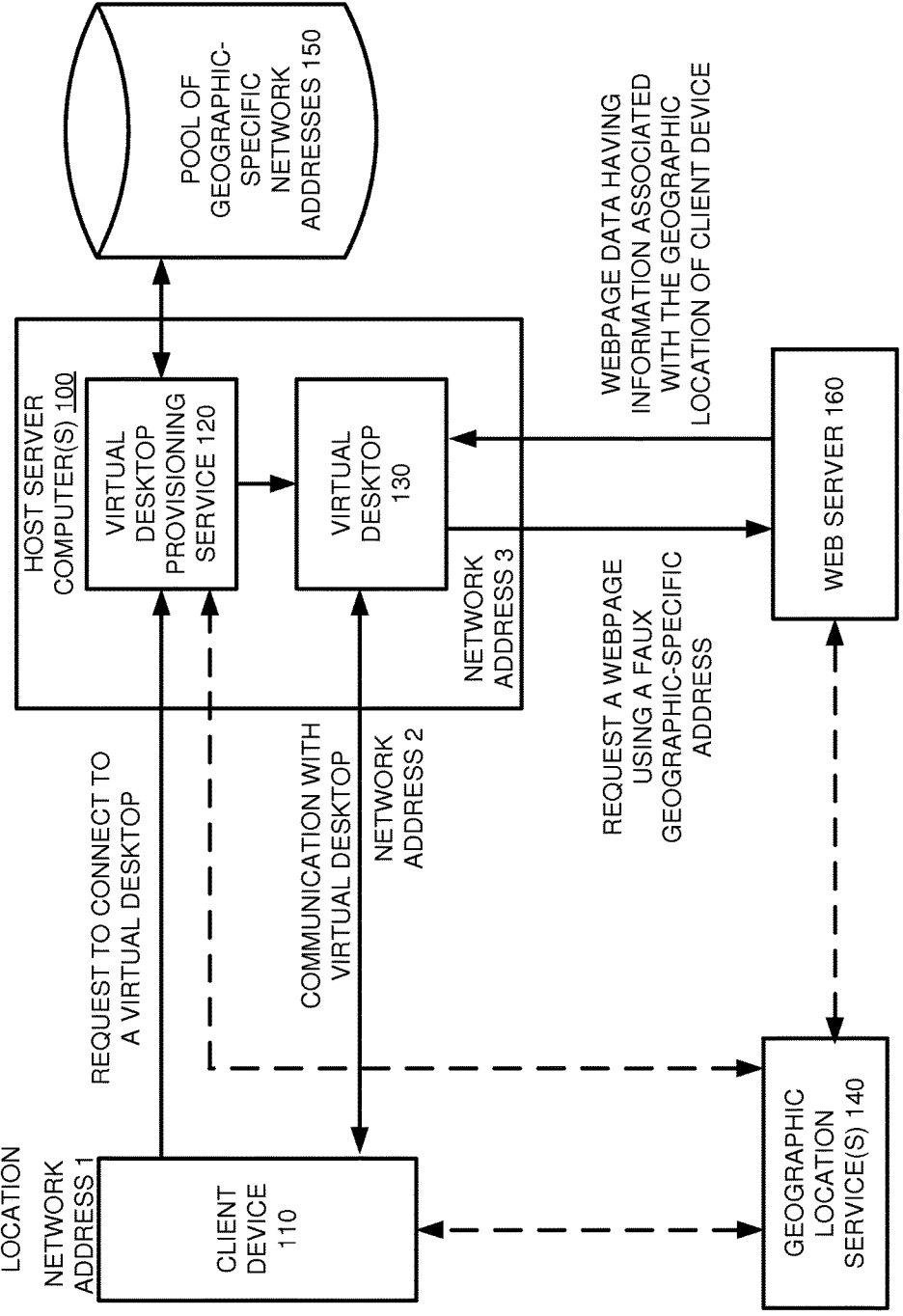
FIG. 1 is an example system diagram showing a geographic-aware virtual desktop.

Web services are commonly used in cloud computing. A web service is a software function provided at a network address over the web or the cloud. Clients initiate web service requests to servers and servers process the requests and return appropriate responses. The client web service requests are typically initiated using, for example, an application programming interface (API) request. For purposes of simplicity, web service requests will be generally described below as API requests, but it is understood that other web service requests can be made. An API request is a programmatic interface to a defined request-response message system, typically expressed in JSON or XML, which is exposed via the web—most commonly by means of an HTTP-based web server. Thus, in certain implementations, an API can be defined as a set of Hypertext Transfer Protocol (HTTP) request messages, along with a definition of the structure of response messages, which can be in an Extensible Markup Language (XML) or JavaScript Object Notation (JSON) format. The API can specify a set of functions or routines that perform an action, which includes accomplishing a specific task or allowing interaction with a software component. When a web service receives the API request from a client device, the web service can generate a response to the request and send the response to the endpoint identified in the request.

A cloud service provider can provide a virtual desktop service which provides end-users a remote workspace or virtual desktop hosted in a data center of the cloud service provider. The end-users can be located anywhere, but data centers may be located in only a limited number of geographic locations. Thus, a user can connect from one geographic location to a workspace or desktop hosted in another geographic location. As an example, a user in Vienna can connect to a virtual desktop executing on a host computer server located in Dublin.

When the user is connected to the virtual desktop, an assignable IP address of a cloud-computing system, such as an elastic Internet Protocol (EIP) address, can be allocated for the virtual desktop. The EIP address is typically registered in the geographic region where the data center is located (e.g., Dublin). When the user requests a webpage using the virtual desktop, a source IP address of the request will be the EIP address that is registered in the Dublin region. Some web servers analyze the source IP address of the request and tailor the information returned to the requestor based on the source IP address of the request. Thus, the information in the webpage returned to the user can include information specific to the geographic location of the data center rather than the geographic location of the user, because the IP address of the request is registered in the data center location and not in the location of the user. For example, if the user in Vienna uses the virtual desktop to bring up a website such as www.news.google.com, the user may be shown "local" news from the Dublin region (where the data center is) rather than news from the Vienna region (where the user is). In this situation, using the virtual desktop results in a noticeably different experience than if the user were using a desktop at the location of the user. However, the cloud service provider may desire to replicate the local desktop experience as closely as possible to increase user satisfaction with the virtual desktop service and/or to potentially increase the likelihood that a user will convert to using the virtual desktop service.

As described herein, virtual desktop services can include an awareness of geographic locations and can potentially improve user satisfaction with the virtual desktop services. For example, a virtual desktop provisioning service can maintain a pool of geographic-specific IP addresses which includes IP addresses registered across various geographic regions and/or countries. When a user of the service is connected to a virtual desktop, the EIP address allocated for the virtual desktop can be allocated from the pool of geographic-specific IP addresses. For example, the pool of geographic-specific IP addresses can include addresses registered in Seattle, Dublin, Vienna, London, Barcelona, Brussels, Hyderabad, Beijing, and/or any other suitable location. The location of the user can be determined and the EIP address allocated for the virtual desktop can be allocated based on the location of the user. For example, the EIP address corresponding to the closest geographic location to the user can be selected. Thus, a user connecting to the service from Vienna can be given a virtual desktop having an EIP address registered in Vienna (rather than Dublin, where the data center is located). Now, when the user requests a webpage using the virtual desktop, the source IP address of the request can be an address registered in Vienna and the information in the webpage can be tailored for a user in Vienna.

FIG. 1 is an example system diagram showing a geographic-aware virtual desktop. A client device 110 can be located at a first geographic location and a host server computer 100 can be located at a second geographic location. For example, the host server computer 100 can be located in a remote data center of a cloud service provider. The host server computer 100 can include a virtual desktop provisioning service 120 for configuring or provisioning a virtual desktop 130. The client device 110 can request to connect to a virtual desktop by issuing a request to the virtual desktop provisioning service 120 via the Internet or other communications network.

The client device 110 can be a mobile device, a desktop computer, a game console, a set-top box, a laptop computer, a tablet computer, a personal digital assistant, a smartphone, a cellular phone, or any suitable computing environment, for example. The client device 110 can include software and/or hardware for connecting to the host server computer 100 and the virtual desktop provisioning service 120. As one example, the client device 110 can include a web browser for communicating with the host server computer 100 and retrieving a login page of the virtual desktop provisioning service 120. As another example, the client device 110 can include a client application capable of sending requests to the virtual desktop provisioning service 120 when the client application is started.

The virtual desktop provisioning service 120 can be a web service executing on the host server computer 100. The virtual desktop provisioning service 120 can be used to set up or configure a new virtual desktop. Configuration or provisioning of a new virtual desktop can include entering customer credentials, defining the properties of the virtual desktop, and assigning an end-user to the virtual desktop. For example, a customer of the cloud service provider can login to the virtual desktop provisioning service 120 using his or her credentials. The customer can provision a virtual desktop for an end-user via a management console of the virtual desktop provisioning service 120. The customer can choose a configuration of computing resources, storage space, and software applications for the virtual desktop and assign it to the end-user. The customer can set policies to control what the end-user can customize and what actions the end-user can perform (such as whether the end-user will have administrator privileges within the virtual desktop). The customer can enter temporary credentials for the end-user to access the virtual desktop 130, existing end-user credentials can be used, or the virtual desktop provisioning service 120 can provide credentials in an email to the end-user. For example, the virtual desktop provisioning service 120 can send an email to the end-user with instructions for connecting to the newly created virtual desktop.

The virtual desktop provisioning service 120 can receive a request for the client device 110 to connect to the preconfigured virtual desktop 130, and the virtual desktop provisioning service 120 can launch the virtual desktop 130 if the end-user credentials are authenticated. For example, the virtual desktop provisioning service 120 can communicate over a communications network with a client application or a browser running on the client device 110. For example, the virtual desktop provisioning service 120 can communicate with the client device 110 using Internet Protocol (IP) packets. The virtual desktop provisioning service 120 can provide a login page for an end-user to enter credentials to begin using the virtual desktop 130. If the credentials of the end-user are authenticated, the virtual desktop provisioning service 120 can allocate resources on the host server computer 100, start the virtual desktop 130 using the allocated resources, and allow the client device 110 to connect to the virtual desktop 130. The client device 110 can communicate with the virtual desktop 130 via network address 2.

The virtual desktop provisioning service 120 can allocate or assign an external-facing network address for the virtual desktop 130 based on the geographic location of the client device 110. The virtual desktop provisioning service 120 can determine the geographic location of the client device 110. For example, the request to connect to the virtual desktop can include the geographic location, the geographic location can be specified by the customer when the virtual desktop is provisioned, or the geographic location can be determined based on the network address of the client device 110 (e.g., network address 1). As one example, the end-user can be prompted for his or her geographic location by the client application or the virtual desktop provisioning service 120 when the client device 100 attempts to connect to the virtual desktop 130. As another example, the customer can specify the geographic location of the end-user and/or client device 110 when the customer provisions a new virtual desktop for the end-user. The request to connect to the virtual desktop can include an identifier associated with the end-user and/or the client device 110 and the identifier can be used as a key to retrieve the geographic location specified by the customer. As yet another example, the virtual desktop provisioning service 120 can perform a translation from the network address to the geographic address. In particular, the network address of the client device 110 can be determined by analyzing the network packet of the request. For example, the request can be an IP packet having a source IP address corresponding to the network address of the client device 110. The translation from the network address to the geographic address can be performed by a geographic location (geolocation) service. The geolocation service can be an internal service executing on the host server computer 100 or it can be an external service accessible over the network.

A geolocation service, such as geographic location services 140, can use network address registration information to translate from a network address (e.g., an IP address) to a geographic address. In particular, each device directly connected to the Internet is supposed to be assigned a unique IP address. In order to enforce the uniqueness of IP addresses, there is a registration system of IP addresses coordinated by the Internet Corporation for Assigned Names and Numbers (ICANN). ICANN and its partners can provide an entity (e.g., an ISP, a company, an organization, or an end-user) with one or more IP addresses when the entity completes a registration process. The registrations can include identifying information which can be searched by public "whois" databases. These databases map logical Internet identifiers (e.g., autonomous system numbers, domain names, and IP addresses) to real-world entities. By using one or more of the whois databases, the entity to whom a given IP address is registered can be determined as well as contact information for the entity (such as a telephone number and a mailing address). The geographic location associated with the network address can be inferred from the telephone number, the mailing address, or the entity name (such as by searching business registration databases).

A cloud service provider with multiple offices and/or subsidiaries can register blocks of IP addresses using different contact information for each of the blocks. For example, an Irish subsidiary with a mailing address in Dublin can register a first block of IP addresses and an Austrian subsidiary with a mailing address in Vienna can register a second block of IP addresses. Thus, the geographic location services 140, using a whois database, can map the first block of IP addresses to Dublin and the second block of IP addresses to Vienna. The different blocks of network addresses can be made available for the host server computer 100 to use when allocating a network address for the virtual desktop 130.

For example, a pool of geographic-specific network addresses 150 can be maintained. The pool of geographic-specific network addresses 150 can include geographic-specific IP addresses associated with multiple geographic locations. Each geographic-specific IP address can be associated with a respective geographic location. For example, the pool 150 can include a block of IP addresses associated with Dublin, Ireland, and a block of IP addresses associated with Vienna, Austria. The multiple geographic locations can include different countries and/or different regions of a country. For example, the cloud service provider can register one block of addresses with a Washington subsidiary and another block of addresses with an Oregon subsidiary. The pool of geographic-specific network addresses 150 can be stored on removable or non-removable media, including magnetic disks, direct-attached storage, network-attached storage (NAS), storage area networks (SAN), redundant arrays of independent disks (RAID), magnetic tapes or cassettes, CD-ROMs, DVDs, or any other medium which can be used to store information in a non-transitory way and which can be accessed by the virtual desktop provisioning service 120. The pool of geographic-specific network addresses 150 can be stored in a data center including the host server computer 100, or in a remote location that is accessible over the Internet or another network.

The virtual desktop provisioning service 120 can select a "faux" network address for the virtual desktop 130 from the pool of geographic-specific IP addresses 150 and based on the geographic location of the client device 110. The network address for the virtual desktop 130 is a "faux" network address because the address can appear to be associated with a different geographic location than the host server computer 100. For example, the host server computer 100 can be located in Dublin, but the "faux" network address for the virtual desktop 130 can appear to be from Vienna. In other words, the "faux" network address can make it appear as though the virtual desktop 130 is located in a different geographic location than the host server computer 100 for requests transmitted to third-party web servers from the virtual desktop 130. The "faux" network address (e.g., network address 3) can be used for external network traffic of the virtual desktop 130 that is not between the client device 110 and the virtual desktop 130. In other words, the "faux" network address can be used as the external-facing network address of the virtual desktop 130. The client device 110 can communicate with the virtual desktop 130 via network address 2.

The virtual desktop 130 can be a web service executing on the host server computer 100. The virtual desktop 130 can be configured to emulate a traditional desktop computer. For example, the virtual desktop 130 can include virtual hardware resources (such as computing resources and memory), an operating system, application programs, storage space, and networking resources. As one example, the virtual desktop 130 can emulate a remote desktop capable of running a web-browser. Thus, an end-user of the client device 110 can connect to the virtual desktop 130, as described above, and perform computing tasks using the virtual desktop 130. Input to the virtual desktop 130 can occur at the client device 110 and be transmitted to the virtual desktop 130. For example, the user can type, point, and/or click via a user interface of the client device 110, the user input can be communicated to the virtual desktop 130, and the virtual desktop 130 can perform as if the user input is entered on a desktop computer. Output of the virtual desktop 130 can be generated by the virtual desktop 130 and transmitted to the client device 110. For example, the virtual desktop 130 can communicate audio/visual updates to the client device 110 so the end-user can see a display and hear sounds as if the output is produced by a desktop computer.

For example, the user can start a web-browser within the virtual desktop 130 and can enter a uniform resource locator (URL) for a webpage located on a web server 160. In response, the virtual desktop 130 can generate a Hypertext Transfer Protocol (HTTP) request to the web server 160 for the webpage. The HTTP request can be transmitted from the host server computer 100 via a network packet using the faux geographic-specific network address assigned to the virtual desktop 130. For example, the HTTP request can be transmitted from the host server computer 100 via an IP packet using the faux geographic-specific network address assigned to the virtual desktop 130 as the source IP address.

The web server 160 can receive the transmitted network packet containing the HTTP request, and the web server 160 can determine a geographic location associated with the network packet. For example, the web server 160 can make a remote call to geographic location services 140 to determine the geographic location associated with the network packet. The geographic location services 140 will return the geographic location associated with the faux geographic-specific network address, which is the geographic location associated with the client device 110, rather than the geographic location associated with the host server computer 100. The web server 160 can customize the webpage based on the geographic location associated with the client device 110. For example, the web server 160 can customize the webpage with the local time, language, weather, or news. The customized webpage can be returned to the virtual desktop 130. The end-user can view the webpage using the client device 110 and the user experience can appear to be more like a traditional desktop since the webpage is customized based on the location of the user.

In addition to web browsers, other applications running within the virtual desktop 130 can be affected by the faux geographic-specific network address assigned to the virtual desktop 130. Specifically, the other applications can identify messages or traffic originating from the virtual desktop 130 as originating from the geographic location associated with the faux geographic-specific network address. For example, a chat application can identify an end-user using the chat application as being in a geographic location associated with the faux geographic-specific network address.

Figure 2:
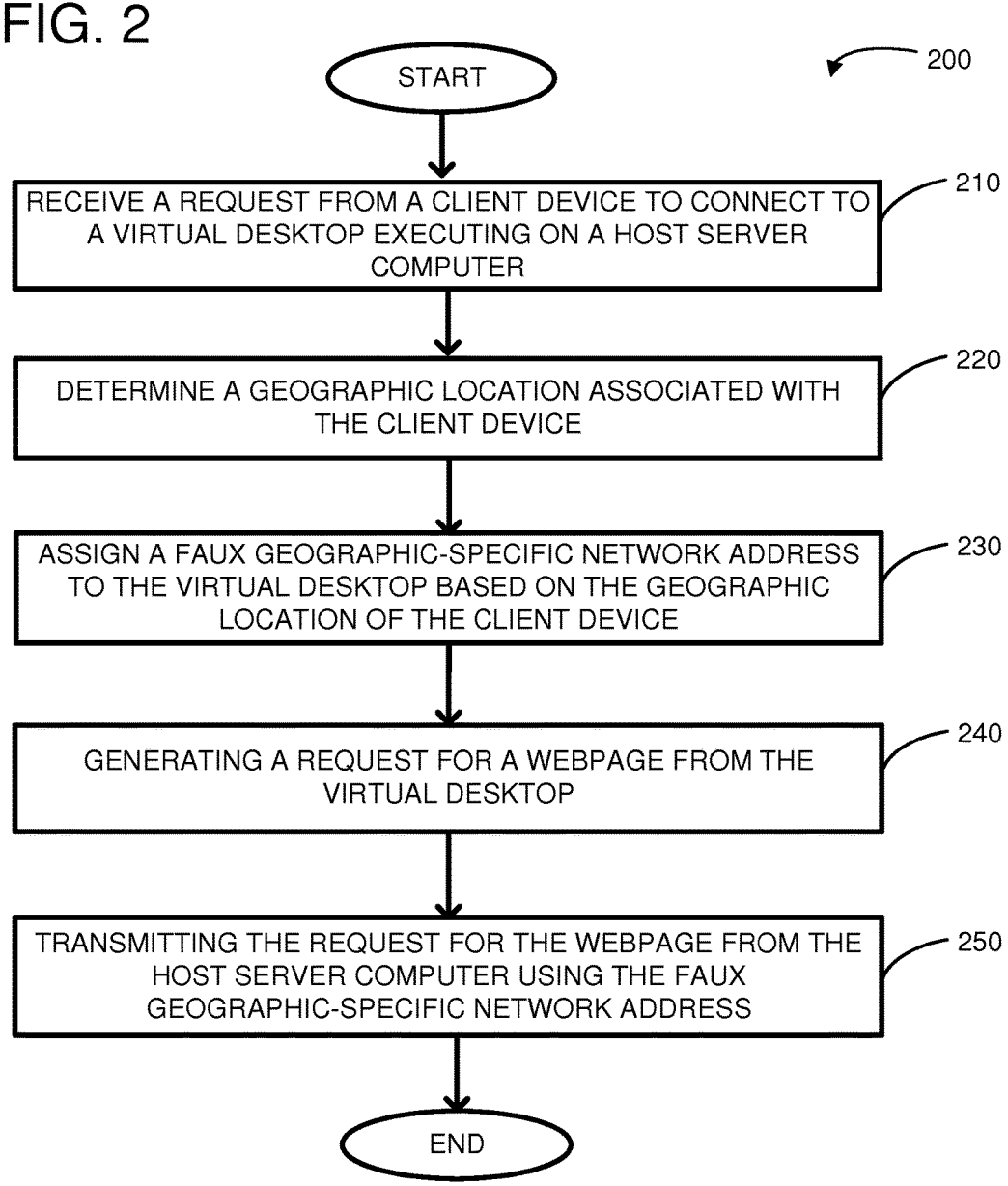
FIG. 2 is a flow diagram showing an example method for configuring and communicating with the geographic-aware virtual desktop.

FIG. 2 is a flow diagram showing an example method 200 for configuring and communicating with the geographic-aware virtual desktop. At 210, a request can be received from a client device to connect to a virtual desktop executing on a host server computer. For example, a request can be received from the client device 110 to connect to the virtual desktop 130 executing on the host server computer 100. The client device 110 can be in a first geographic location and the host server computer 100 can be in a second geographic location.

At 220, a geographic location associated with the client device can be determined. As one example, the client device 110 can determine its geographic location and the request at 210 can include the geographic location. The virtual desktop provisioning service 120 can determine the location of the client device 110 by analyzing the request from the client device 110. The client device 110 can determine its geographic location in various ways, such as: the client device 110 can include GPS hardware and/or software; the client device 110 can access the geographic location services 140 using its IP address for the lookup; and the end-user can enter the geographic location when setting up client application software or when setting up a virtual desktop. As another example, the virtual desktop provisioning service 120 can determine the location of the client device 110 by: prompting the end-user for the location when the client device 110 requests to connect to the virtual desktop; prompting the customer to enter the location of the end-user when the virtual desktop 130 is provisioned; or accessing the geographic location services 140 using the IP address of the client device 100 for the lookup.

At 230, a faux geographic-specific network address can be assigned to the virtual desktop based on the geographic location of the client device 110. For example, the pool of geographic-specific network addresses 150 can include geographic-specific network addresses from multiple geographic locations. If the pool includes a geographic-specific network address that exactly matches the geographic location associated with the client device 110, then the matching geographic-specific network address can be selected as the faux geographic-specific network address. If there is not an exact match, the assignment can be based on distance. For example, distances can be calculated between the geographic location associated with the client device 110 and geographic locations associated with respective network addresses from the pool of geographic-specific network addresses 150. The network address that is associated with the geographic location closest to the geographic location of the client device 110 can be selected as the faux geographic-specific network address.

Other criteria can also be used to assign the faux geographic-specific network address. For example, the closest geographic-specific network address may be located in a different country with a different natural language than the end-user of the client device 110. Thus, the faux geographic-specific network address can be selected based on the countries or languages associated with the geographic location of the client device 110 and the respective geographic-specific network addresses from the pool. By assigning the faux geographic-specific network address to the virtual desktop 130, it can appear as though the virtual desktop 130 is located close to or in the same geographic location as the client device 110 for requests transmitted to third-party web servers.

At 240, a request can be generated for a webpage using the virtual desktop 130. For example, after the client device 110 connects to the virtual desktop 130 (the virtual desktop 130 is established), the end-user can begin using the virtual desktop 130. The end-user can use a web-browser within the virtual desktop 130 to generate a request to a third-party web server for a webpage. The request can be encapsulated in a network packet that includes the faux geographic-specific network address. For example, the request can be encapsulated in an IP packet that uses the faux geographic-specific network address as the source IP address field.

At 250, the request for the webpage can be transmitted from the host server computer 100 using the faux geographic-specific IP address. For example, the request for the webpage can be transmitted from a network interface of the host server computer 100 so that it can be delivered to the third-party web server. The third-party web server may tailor the information in the webpage based on the faux geographic-specific IP address. The webpage can be returned by the third-party web server to the host server computer 100 and can be displayed within the virtual desktop 130 (which is visible to the end-user via the client device 110).

Figure 3:
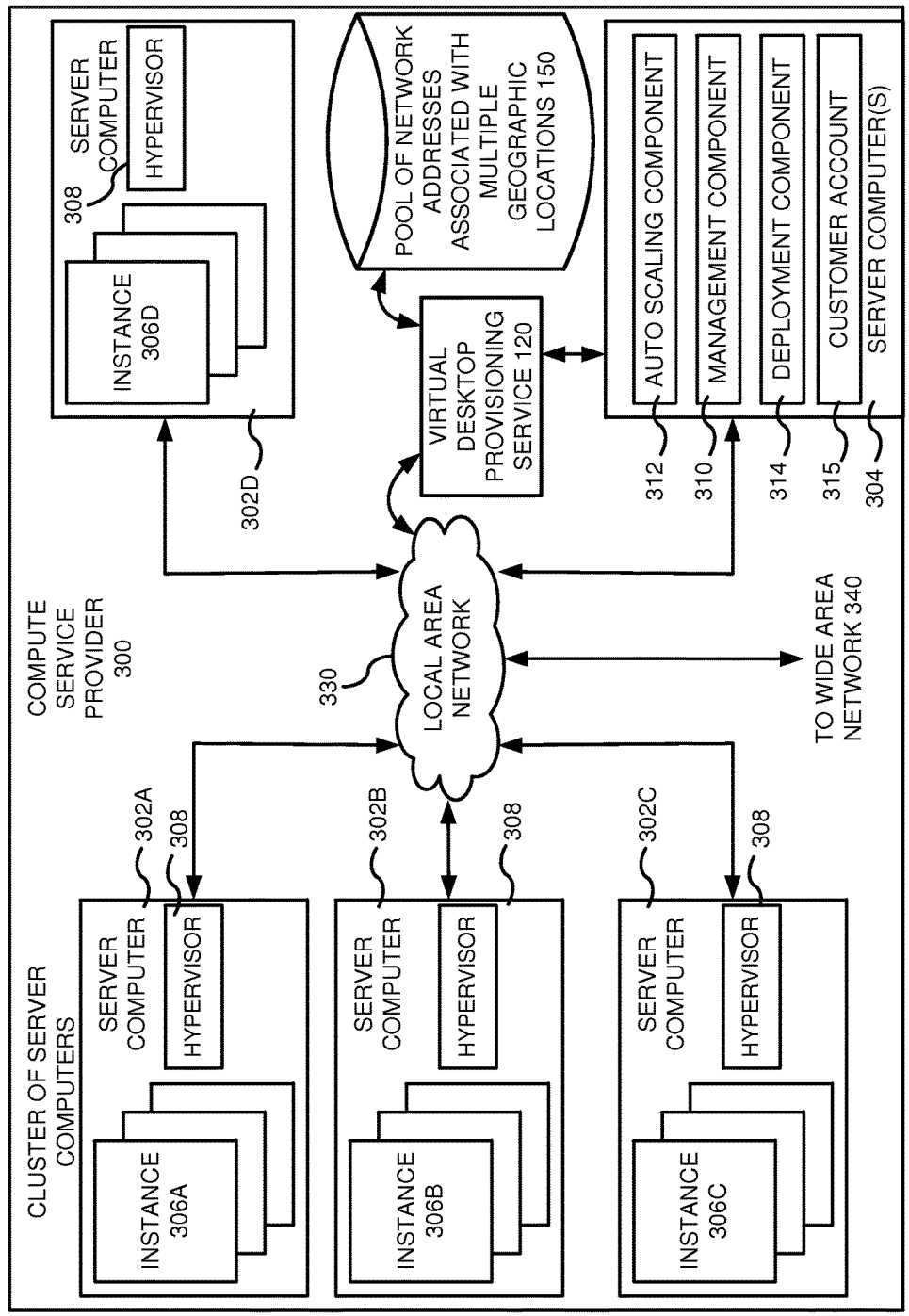
FIG. 3 is an example system diagram showing a plurality of virtual machine instances running in a multi-tenant environment.

FIG. 3 is a computing system diagram of a network-based compute service provider 300 that illustrates one environment in which embodiments described herein can be used. By way of background, the compute service provider 300 (i.e., the cloud provider) is capable of delivery of computing and storage capacity as a service to a community of end recipients. In an example embodiment, the compute service provider can be established for an organization by or on behalf of the organization. That is, the compute service provider 300 may offer a "private cloud environment." In another embodiment, the compute service provider 300 supports a multi-tenant environment, wherein a plurality of customers operate independently (i.e., a public cloud environment). Generally speaking, the compute service provider 300 can provide the following models: Infrastructure as a Service ("IaaS"), Platform as a Service ("PaaS"), and/or Software as a Service ("SaaS"). Other models can be provided. For the IaaS model, the compute service provider 300 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 300 using networked client devices, such as desktop computers, laptops, tablets, smartphones, etc. running web browsers or other lightweight client applications. Those skilled in the art will recognize that the compute service provider 300 can be described as a "cloud" environment.

The particular illustrated compute service provider 300 includes a plurality of server computers 302A-302D. While only four server computers are shown, any number can be used, and large centers can include thousands of server computers. The server computers 302A-302D can provide computing resources for executing software instances 306A-306D. In one embodiment, the instances 306A-306D are virtual machines. As known in the art, a virtual machine is an instance of a software implementation of a machine (i.e. a computer) that executes applications like a physical machine. In the example virtual machine, each of the servers 302A-302D can be configured to execute a hypervisor 308 or another type of program configured to enable the execution of multiple instances 306 on a single server. Additionally, each of the instances 306 can be configured to execute one or more applications, such as the virtual desktop 130.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 304 can be reserved for executing software components for managing the operation of the server computers 302 and the instances 306. For example, the server computer 304 can execute a management component 310. A customer can access the management component 310 to configure various aspects of the operation of the instances 306 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 312 can scale the instances 306 based upon rules defined by the customer. In one embodiment, the auto scaling component 312 allows a customer to specify scale-up rules for use in determining when new instances should be instantiated and scale-down rules for use in determining when existing instances should be terminated. The auto scaling component 312 can consist of a number of subcomponents executing on different server computers 302 or other computing devices. The auto scaling component 312 can monitor available computing resources over an internal management network and modify resources available based on need.

A deployment component 314 can be used to assist customers in the deployment of new instances 306 of computing resources. The deployment component can have access to account information associated with the instances, such as who is the owner of the account, credit card information, country of the owner, etc. The deployment component 314 can receive a configuration from a customer that includes data describing how new instances 306 should be configured. For example, the configuration can specify one or more applications to be installed in new instances 306, provide scripts and/or other types of code to be executed for configuring new instances 306, provide cache logic specifying how an application cache should be prepared, and other types of information. The deployment component 314 can utilize the customer-provided configuration and cache logic to configure, prime, and launch new instances 306. The configuration, cache logic, and other information may be specified by a customer using the management component 310 or by providing this information directly to the deployment component 314. The instance manager can be considered part of the deployment component.

Customer account information 315 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc.

A network 330 can be utilized to interconnect the server computers 302A-302D and the server computer 304. The network 330 can be a local area network (LAN) and can be connected to a Wide Area Network (WAN) 340 so that end users can access the compute service provider 300. It should be appreciated that the network topology illustrated in FIG. 3 has been simplified and that many more networks and networking devices can be utilized to interconnect the various computing systems disclosed herein.

The virtual desktop provisioning service 120 can be used for provisioning and launching instances of the virtual desktop 130. The virtual desktop provisioning service 120 can be integrated with the components of the server computer 304 or the virtual desktop provisioning service 120 can make calls to the components of the server computer 304. As described above, the virtual desktop provisioning service 120 can be used by a customer to set up or configure virtual desktops for one or more end-users. The virtual desktop provisioning service 120 can launch or establish a virtual desktop instance in response to receiving an authenticated connection request from the client device 110. For example, the virtual desktop instance can be launched on instances 306A-D. The virtual desktop provisioning service 120 can determine the geographic location associated with the client device 110 and can assign a faux geographic-specific network address to the virtual desktop instance based on the determined geographic location associated with the client device 110. The faux geographic-specific network address can be selected from the pool of network addresses associated with multiple geographic locations 150. The faux geographic-specific network address can be used for external network traffic of the virtual desktop instance that is not between the virtual desktop instance and the client device 110. The faux geographic-specific network address can also be used by other applications running in the virtual desktop instance to determine a location associated with the virtual desktop instance.

Figure 4:
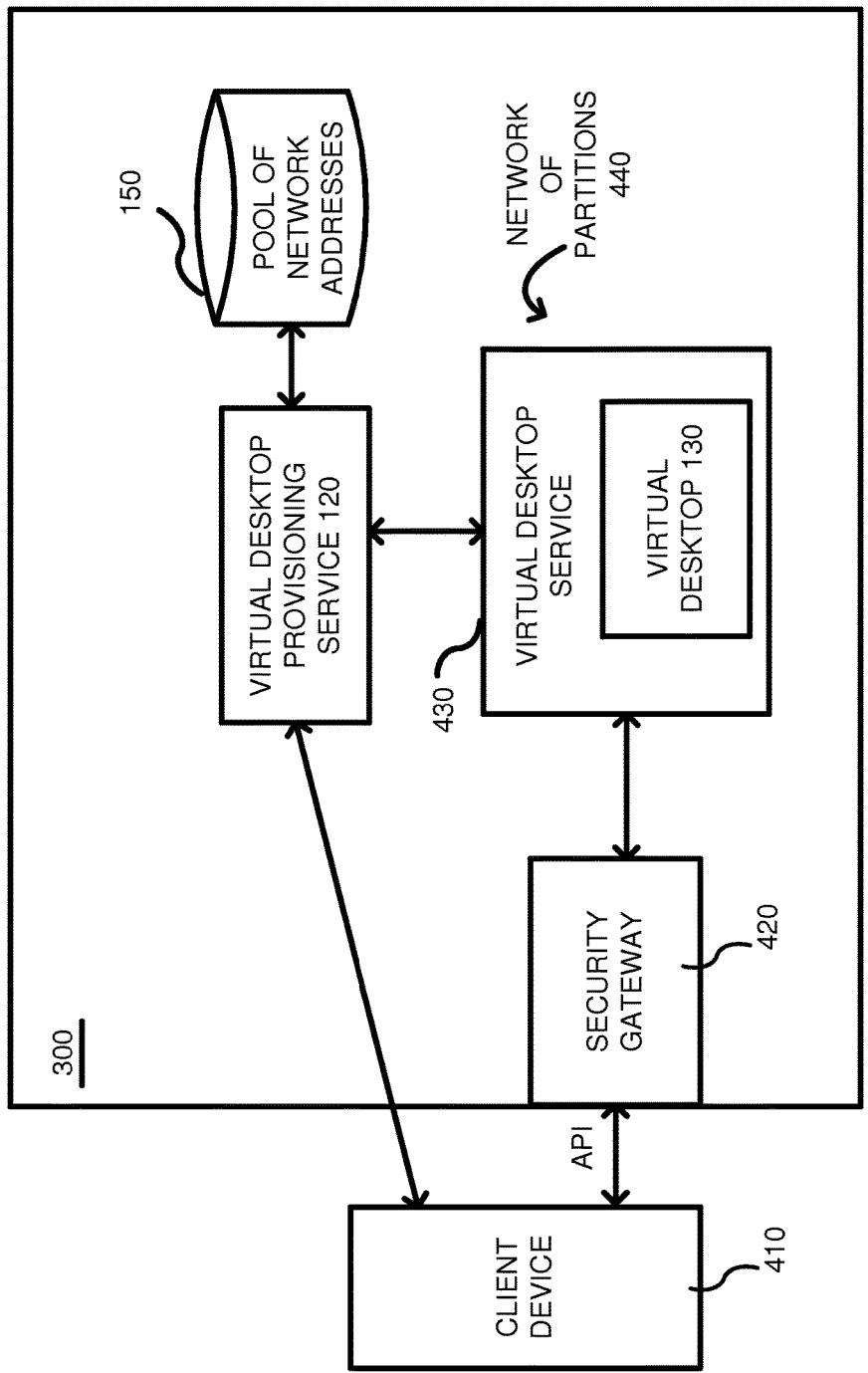
FIG. 4 shows further details of an example system including a plurality of management components associated with a control plane.

FIG. 4 illustrates in further detail management components that can be used for providing the virtual desktop 130 in the multi-tenant environment of the compute service provider 300. In order to access and utilize the virtual desktop 130 running on instances (such as instances 306 of FIG. 3), a client device 410 can be used. The instances can be launched on a physical layer (such as a network of partitions 440 of FIG. 5) of the compute service provider 300. The client device 410 can be any of a variety of computing devices, mobile or otherwise including a cell phone, smartphone, handheld computer, Personal Digital Assistant (PDA), desktop computer, etc. The client device 410 can communicate with the compute service provider 300 through one or more end points, which can be DNS addresses designed to receive and process API requests. For example, a security gateway 420 and the virtual desktop provisioning service 120 can each include an endpoint. The end point can be a web server configured to expose an API. Using the API requests, the client device 410 can make requests to implement any of the functionality described herein.

The virtual computing environment can include one or more agents that are configured to verify user identities and establish a connection between the compute service provider 300 and the client device 410 to enable access to the virtual desktop 130. For example, the client device 410 can be operably interconnected to a virtual desktop provisioning service 120, which can be an agent configured to enable joining of one or more clients to the virtual desktop service 430. In an embodiment, an administrator, via a client device 410, can access the virtual desktop service 430 to provision one or more virtual desktops 130. An administrator using client device 410 can provide administrative credentials usable to identify the administrator and/or an associated account specifying one or more permissions for accessing and modifying objects within the virtual desktop. The credentials can be used by the virtual desktop provisioning service 120 in order to authenticate the administrator, confirm that the client device 410 maintains the proper authority to access the virtual desktop 130, and perform additional configuration and connection procedures directed to the provisioning of a communications channel between the client and the virtual desktop service.

The virtual desktop provisioning service 120, once having determined proper authorization of the requesting customer client, can assign a faux geographic-specific network address to the virtual desktop 130 associated with the customer client. A network interface associated with the virtual desktop 130 can be configured with the faux geographic-specific network address for routing network traffic between the virtual desktop instance and other network devices. The faux geographic-specific network address can be selected from the pool of network addresses 150. The virtual desktop provisioning service 120 can provide the client device 410 with a network address of the virtual desktop 130 to which the customer client is attempting to access. The virtual desktop provisioning service 120 can provision a communications channel be provisioned, where the communications channel can be used to connect the user client to the virtual desktop service 430 via the security gateway 420. The security gateway 420 can be a proxy server configured to enable connections between the clients and the virtual desktop service 430 in order for the clients to receive access to the virtual desktop 130.

Figure 5:
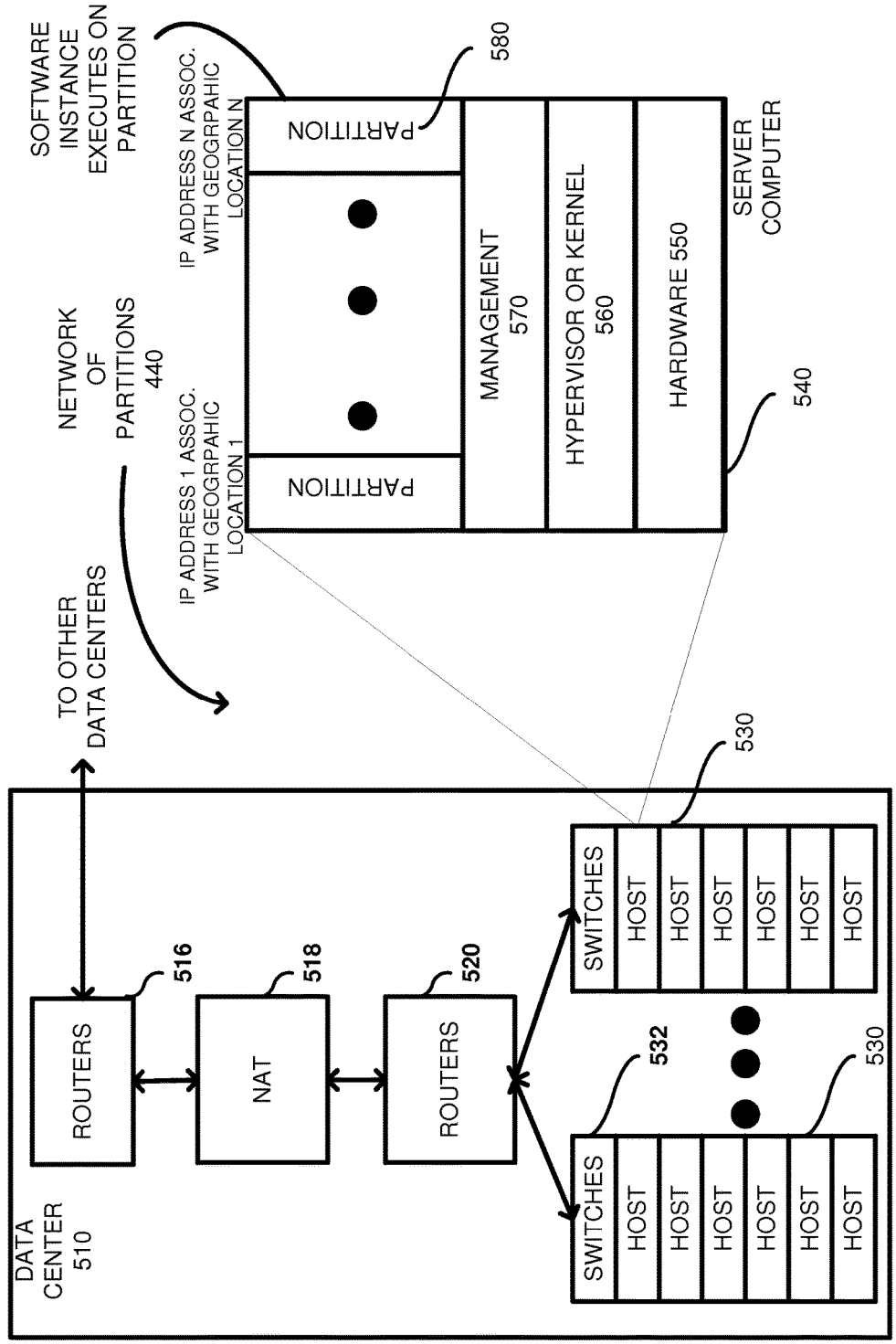
FIG. 5 shows an example of a plurality of host computers, routers and switches, which are hardware assets used for running virtual machine instances.

FIG. 5 illustrates the network of partitions 440 and the physical hardware associated therewith. The network of partitions 440 can include a plurality of data centers, such as data center 510, coupled together by routers 516. The routers 516 read address information in a received packet and determine the packet's destination. If the router decides that a different data center contains a host server computer, then the packet is forwarded to that data center. If the packet is addressed to a host in the data center 510, then it is passed to a network address translator (NAT) 518 that converts the packet's external-facing or public IP address to a private IP address. The NAT also translates private addresses to public addresses that are bound outside of the data center 510. Additional routers 520 can be coupled to the NAT to route packets to one or more racks of host server computers 530. Each rack 530 can include a switch 532 coupled to multiple host server computers. A particular host server computer is shown in an expanded view at 540.

Each host 540 has underlying hardware 550 including one or more CPUs, memory, storage devices, etc. Running a layer above the hardware 550 is a hypervisor or kernel layer 560. The hypervisor or kernel layer can be classified as a type 1 or type 2 hypervisor. A type 1 hypervisor runs directly on the host hardware 550 to control the hardware and to manage the guest operating systems. A type 2 hypervisor runs within a conventional operating system environment. Thus, in a type 2 environment, the hypervisor can be a distinct layer running above the operating system and the operating system interacts with the system hardware. Different types of hypervisors include Xen-based, Hyper-V, ESXi/ESX, Linux, etc., but other hypervisors can be used. A management layer 570 can be part of the hypervisor or separated therefrom and generally includes device drivers needed for accessing the hardware 550. The partitions 580 are logical units of isolation by the hypervisor. Each partition 580 can be allocated its own portion of the hardware layer's memory, CPU allocation, storage, etc. Additionally, each partition can include a virtual machine and its own guest operating system. As such, each partition is an abstract portion of capacity designed to support its own virtual machine independent of the other partitions. Each partition 580 can be used to execute an individual virtual desktop and so each partition 580 can be assigned a public IP address associated with a geographic location of the client using the individual virtual desktop. Thus, a first partition can be assigned a first public IP address associated with a first client location and a second partition can be assigned a second public IP address associated with a second client location, where the first partition and the second partition are executing on the same host computer. In other words, the same host computer can execute multiple instances of a virtual desktop, where the respective instances are assigned network addresses associated with different geographic locations.

Figure 6:
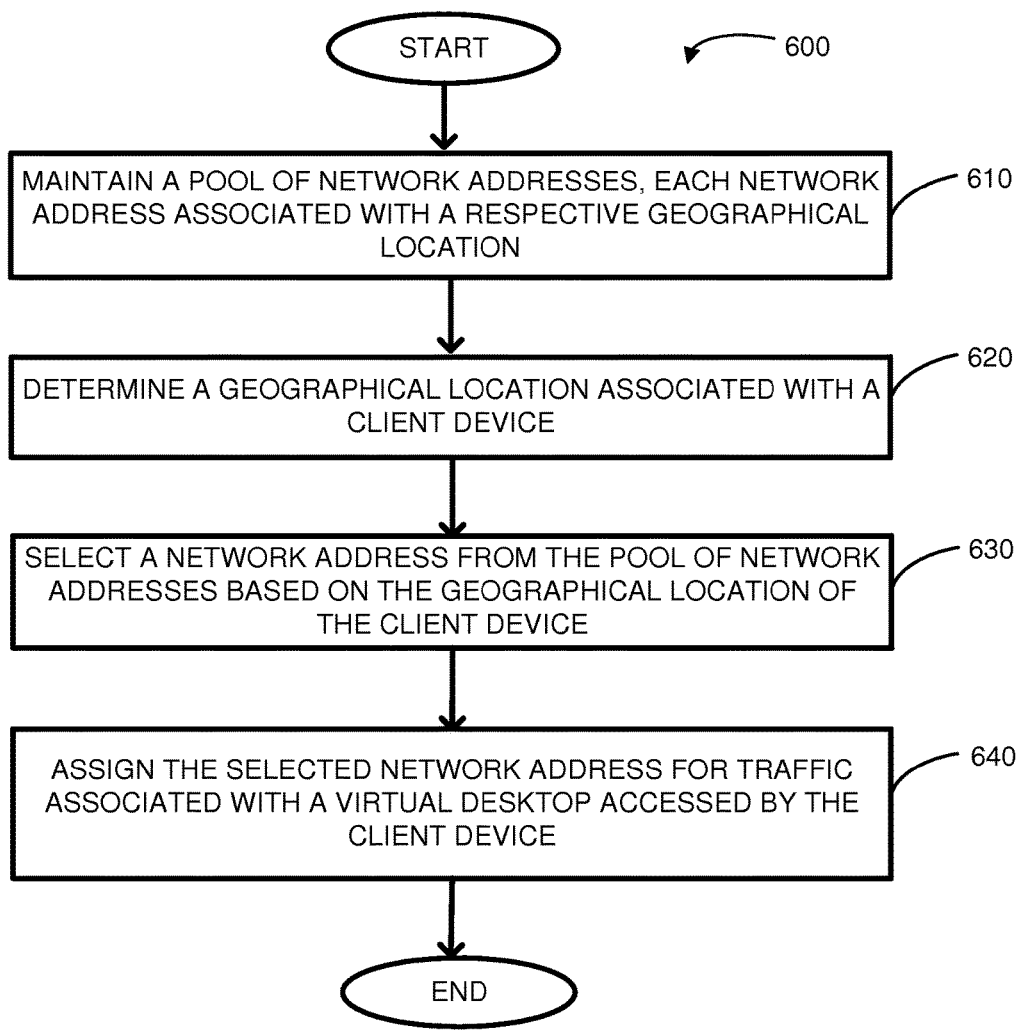
FIG. 6 is a flow diagram showing an example method for configuring the geographic-aware virtual desktop.

FIG. 6 is a flow diagram showing an example method 600 for configuring the geographic-aware virtual desktop. At 610, a pool of network addresses can be maintained. Each of the network addresses can be associated with a respective geographical location. The pool of network addresses can include network addresses associated with different respective geographical locations. For example, a first network addresses can be associated with a first geographical location, such as Ireland, and a second network addresses can be associated with a second geographical location, such as Austria. When a new virtual desktop is created, a network address can be removed from the pool of network addresses for use with the new virtual desktop. When a virtual desktop is terminated or deallocated, the network address associated with the deallocated virtual desktop can be returned to the pool of network addresses. The usage of the network addresses by the virtual desktops and within the pool can be monitored and adjustments to the pool can be made in response to the monitoring. For example, if network addresses associated with a particular geographical location are in short supply, the cloud service provider can register and add more network addresses associated with the particular geographical location. As another example, if a threshold of client devices connecting from a given geographical location are not represented by the geographical locations of the pool, the cloud service provider can register and add network addresses associated with the given geographical location.

At 620, a geographical location associated with a client device accessing a virtual desktop can be determined. As one example, the client device can determine its geographical location and send it in a request to connect to a virtual desktop. The cloud service provider can determine the geographical location of the client by parsing the request. The client device can determine its geographical location in various ways, such as with GPS, using a geolocation service, or retrieving registration information. As another example, the cloud service provider can determine the geographical location of the client in various ways, such as by prompting a customer at provisioning-time, prompting an end-user at connection-time, or using a geolocation service.

At 630, a network address can be selected from the pool of network addresses based on the geographical location associated with the client device. The selected network address can be associated with a geographical location that is closest to the geographical location of the client device based on distance, nationality, language, or other suitable criteria.

At 640, the selected network address can be assigned for external network traffic of a virtual desktop being used by the client device. Thus, webpage requests from the virtual desktop can include the selected network address so that webservers can tailor webpage content based on the geographical location associated with the client device rather than the geographical location of the cloud service provider.

FIG. 7 is a flow diagram showing an example method 700 for managing a pool of network addresses of a service provider. At 710, it is determined whether access to a virtual desktop is requested. If access to a virtual desktop is not requested, the method 700 continues at 760. If access to a virtual desktop is requested, the method 700 continues at 720.

At 720, access to a virtual desktop is requested and the type of connection to the virtual desktop is determined. A virtual desktop can be maintained in different states and the type of connection to the virtual desktop can depend on the state of the virtual desktop. A virtual desktop can be active when the end-user is connected to the virtual desktop. A virtual desktop can be suspended when an end-user was connected the virtual desktop and disconnects from the virtual desktop (either by explicitly disconnecting or inadvertently losing a network connection). A suspended virtual desktop can continue executing on the hardware of the cloud service provider or the state associated with the suspended virtual desktop can be saved to a storage device for retrieval the next time the end-user connects to the virtual desktop. A virtual desktop can be provisioned by a customer, but not activated by an end-user. This can occur, for example, when the end-user has not yet logged into the virtual desktop (e.g., the virtual desktop was just provisioned), when the end-user has explicitly logged off of the virtual desktop, and when the lifetime of a suspended virtual desktop has been exceeded. For example, as one of the policies set during provisioning, the customer can set a limit on the amount of time that a virtual desktop can be suspended before the state associated with the virtual desktop is deleted.

For purposes of explanation, when an end-user connects to a provisioned, inactive virtual desktop, the type of connection is a "fresh connection," and when an end-user connects to a suspended virtual desktop, the type of connection is a "reconnection." If the type of connection is a reconnection, the method 700 can continue at 750. If the type of connection is a fresh connection, the method 700 can continue at 730.

At 730, a geographical location associated with the client device is determined. At 740, a network address is selected and removed from the pool of network addresses based on the geographical location of the client device. In other words, a network address can be removed from the pool of network addresses for a fresh connection to a virtual desktop. When a particular network address is removed from the pool of network addresses, the particular network address cannot be used by other virtual desktops.

At 750, reconnecting to a suspended virtual desktop can keep the pool of network addresses unchanged. For example, the saved state of a suspended virtual desktop can include the faux geographical-specific network address associated with the suspended virtual desktop. Thus, when the end-user reconnects to the suspended virtual desktop, the networking traffic of the virtual desktop can behave in the same manner as before the virtual desktop was suspended. Alternatively, the network address associated with a virtual desktop being suspended can be returned to the pool and a new network address can be selected from the pool during a reconnection.

At 760, it can be determined if the virtual desktop is being terminated, such as during an explicit log-off by the end-user or a time-out of a suspended virtual desktop. If the virtual desktop is not being terminated, the method 700 can end. If the virtual desktop is being terminated, the method 700 can continue at 770.

At 770, the network address associated with the virtual desktop being terminated can be returned to the pool of network addresses. Thus, the particular network address can be used again when the same or another end-user causes a fresh connection to a new virtual desktop.

FIG. 8 depicts a generalized example of a suitable computing environment 800 in which the described innovations may be implemented. The computing environment 800 is not intended to suggest any limitation as to scope of use or functionality, as the innovations may be implemented in diverse general-purpose or special-purpose computing systems. For example, the computing environment 800 can be any of a variety of computing devices (e.g., desktop computer, laptop computer, server computer, tablet computer, etc.)

With reference to FIG. 8, the computing environment 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s).

A computing system may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing environment 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing environment 800. The output device(s) 860 may be a display, printer, speaker, CD-writer, or another device that provides output from the computing environment 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-Programmable Gate Arrays (FPGAs), Application-Specific Integrated Circuits (ASICs), Application-Specific Standard Products (ASSPs), System-On-a-Chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. A method of generating a remote desktop request, the method comprising:

receiving a connection request from a client device in a first geographic location to a host server computer in a second geographic location so as to establish a virtual desktop, wherein the first geographic location and the second geographic location are located in different regions of a country or in different countries;

determining that the client device is located in the first geographic location;

maintaining a pool of faux geographic-specific Internet Protocol (IP) addresses, each faux geographic-specific IP address associated with a respective geographic location, the pool of faux geographic-specific IP addresses including IP addresses associated with different respective geographic locations;

determining distances from the first geographic location of the client device to the different respective geographic locations associated with respective faux geographic-specific IP addresses of the pool of faux geographic-specific IP addresses;

using the determined distances to select a particular faux geographic-specific IP address from the pool of faux geographic-specific IP addresses;

assigning the selected faux geographic-specific IP address to the host server computer so that the virtual desktop executing on the host server computer appears as though it is located in the first geographic location and not in the second geographic location for requests transmitted to third-party web servers;

generating a request for a webpage using the virtual desktop; and transmitting the request for the webpage from the host server computer using the selected faux geographic-specific IP address.

2. The method according to claim 1, wherein determining that the client device is located in the first geographic location comprises:

determining an IP address of the client device; and using a geolocation service to map the IP address of the client device to the first geographic location.

3. The method according to claim 1, wherein determining that the client device is located in the first geographic location comprises receiving an indication of the first geographic location from the client device.

4. The method according to claim 1, wherein the pool of geographic-specific IP addresses comprises a first IP address associated with a first country, and a second IP address associated with a second country.

5. The method according to claim 1, wherein the virtual desktop is a remote desktop executing in a partition of a multi-tenant environment.

6. A computer-readable storage medium including instructions that upon execution cause a computer system to:
   determine a geographical location associated with a client device accessing a virtual desktop, the geographical location corresponding to a region of a country;
   determine distances from the geographical location associated with the client device to geographical locations associated with network addresses of a pool of network addresses, each network address of the pool of network addresses being associated with a respective geographical location, the pool of network addresses including network addresses associated with different respective geographical locations;
   select an external-facing network address from the pool of network addresses based on the determined distances, wherein the geographical location associated with the selected external-facing network address is closer to the geographical location associated with the client device than a geographical location associated with a host server computer allocated to execute the virtual desktop, wherein the geographical location associated with the selected external-facing network address and the geographical location associated with the client device are located in different regions of a country or in different countries; and
   assign the external-facing network address to the host server computer allocated to execute the virtual desktop, the host server computer in a different geographical location than the client device, the external-facing network address used for network traffic associated with the virtual desktop;
   generate a request for a webpage using the virtual desktop; and
   transmit the request for the webpage from the host server computer using the assigned external-facing network address.

7. The computer-readable storage medium according to claim 6, wherein determining the geographical location associated with the client device accessing the virtual desktop comprises:
   determining a network address of the client device; and
   using a geolocation service to map the network address of the client device to the geographical location associated with the client device.

8. The computer-readable storage medium according to claim 6, wherein determining the geographical location associated with the client device accessing the virtual desktop comprises receiving the geographical location from the client device.

9. The computer-readable storage medium according to claim 6, wherein the pool of network addresses comprises a first network address associated with a first country, and a second network address associated with a second country.

10. The computer-readable storage medium according to claim 6, wherein selecting the external-facing network address from the pool of network addresses based on the geographical location associated with the client device comprises selecting a network address associated with the same geographical location associated with the client device and assigning it to a host server computer in a different geographical location, the host server computer for forwarding the network traffic associated with the virtual desktop.

11. The computer-readable storage medium according to claim 6, wherein selecting the external-facing network address from the pool of network addresses based on the geographical location associated with the client device comprises:
   selecting the external-facing network address to be a network address associated with the geographical location that is closest to the geographical location associated with the client device.

12. The computer-readable storage medium according to claim 6, wherein the instructions, upon execution, further cause the computer system to:
   configure a network interface to use the external-facing network address for network traffic associated with the virtual desktop.

13. The computer-readable storage medium according to claim 6, wherein the virtual desktop is a remote desktop executing in a multi-tenant environment.

14. A system for a multi-tenant environment of a service provider comprising:
   a storage system for storing a pool of network addresses, each network address associated with a respective geographical location, the pool of network addresses including network addresses associated with different respective geographical locations, the different geographical locations located in different regions of a country or in different countries; and
   a virtual desktop provisioning service in communication with the storage system, the virtual desktop provisioning service configured to:
      determine a geographical location associated with a client device;
      determine distances from the geographical location associated with the client device to the respective geographical locations associated with network addresses of the pool of network addresses;
      select an external-facing network address from the pool of network addresses based on the determined distances, wherein the geographical location associated with the selected external-facing network address is closer to the geographical location associated with the client device than a geographical location associated with a server computer selected to execute a virtual desktop associated with the client device; and
      configure the virtual desktop associated with the client device to use the external-facing network address for network traffic associated with the virtual desktop, the virtual desktop executing on the server computer in a different geographical location than the geographical location associated with the client device; and
   the virtual desktop configured to:
      generate a request for a webpage; and
      transmit the request for the webpage from the virtual desktop using the selected external-facing network address.

15. The system according to claim 14, wherein determining the geographical location associated with the client device comprises:
   determining a network address of the client device; and
   using a geolocation service to map the network address of the client device to the geographical location associated with the client device.

16. The system according to claim 14, wherein determining the geographical location associated with the client device comprises receiving the geographical location from the client device.

17. The system according to claim 14, wherein the pool of network addresses comprises a first network address associated with a first country, and a second network address associated with a second country.

18. The system according to claim 14, wherein selecting the external-facing network address from the pool of network addresses based on the geographical location associated with the client device comprises selecting a network address associated with the same geographical location associated with the client device.

19. The system according to claim 14, wherein selecting the external-facing network address from the pool of network addresses based on the geographical location associated with the client device comprises:

selecting the external-facing network address to be a network address associated with the geographical location that is closest to the geographical location associated with the client device.

\* \* \* \* \*